United States Patent
Xie

(10) Patent No.: US 11,932,547 B2
(45) Date of Patent: Mar. 19, 2024

(54) ORGANOTEMPLATE-FREE SYNTHESIS OF MOLECULAR SIEVE SSZ-122

(71) Applicant: CHEVRON U.S.A. INC., San Ramon, CA (US)

(72) Inventor: Dan Xie, El Cerrito, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 153 days.

(21) Appl. No.: 17/691,563

(22) Filed: Mar. 10, 2022

(65) Prior Publication Data

US 2023/0286818 A1   Sep. 14, 2023

(51) Int. Cl.
*C01B 39/46* (2006.01)

(52) U.S. Cl.
CPC .......... *C01B 39/46* (2013.01); *C01P 2002/72* (2013.01); *C01P 2004/03* (2013.01)

(58) Field of Classification Search
None
See application file for complete search history.

(56) References Cited

U.S. PATENT DOCUMENTS

| 2013/0046123 A1 | 2/2013 | Canos et al. |
| 2021/0094836 A1 | 4/2021 | Liu et al. |
| 2022/0024775 A1 | 1/2022 | Xie |

FOREIGN PATENT DOCUMENTS

| CN | 106976889 | * | 7/2017 |
| EP | 0021674 | * | 7/1981 |
| WO | 2014140296 | * | 9/2014 |

OTHER PUBLICATIONS

J.J. Pluth and J.V. Smith "Crystat structure of boggsite, a new high-silica zeolite with the first three-dimensional channel system bounded by both 12- and I0-rings" Am. Mineral. 1990, 75, 501-507.
E. Galli, S. Quartieri, G. Vezzalini and A. Alberti "Boggsite and tschernichite-type zeolites from Mt. Adamson, Northern Victoria Land (Antarctica)" Eur. J. Mineral. 1995, 7, 1029-1032.
S. Zanardi, G. Cruciani, A. Alberti and E. Galli "Dehydration and rehydration process in boggsite: An in situ X-ray single-crystal study" Am. Mineral. 2004, 89, 1033-1042.
Q. Huang, N. Chen, L. Liu, K.S. Arias, S. Iborra, X. Yi, C. Ma, W. Liang, A. Zheng, C. Zhang, J. Hu, Z. Cai, Y. Liu, J. Jiang and A. Corma "Direct synthesis of the organic and Ge free Al containing BOG zeolite (ITQ-47) and its application for transformation of biomass derived molecules" Chem. Sci. 2020, 11, 12103-12108.
H. Ghaedi and M. Zhao "Review on Template Removal Techniques for Synthesis of Mesoporous Silica Materials" Energy Fuels, 2022, 36, 2424-2446.
PCT International Search Report, International Application No. PCT/IB2023/051368, dated Jun. 6, 2023.

* cited by examiner

*Primary Examiner* — Sheng H Davis

(57) ABSTRACT

An organotemplate-free synthetic process for synthesizing an aluminosilicate molecular sieve SSZ-122 is provided. The process includes (1) preparing a reaction mixture comprising: (a) a silicon atom source; (b) an aluminum atom source; (c) a source of an alkali metal [M]; (d) a source of hydroxide ions; (e) water; and (f) seed crystals; and (2) subjecting the reaction mixture to crystallization conditions sufficient to form crystals of the aluminosilicate molecular sieve.

10 Claims, 2 Drawing Sheets

ORGANOTEMPLATE-FREE SYNTHESIS OF MOLECULAR SIEVE SSZ-122

FIELD

This disclosure relates to processes for preparing molecular sieve SSZ-122.

BACKGROUND

Molecular sieves are a commercially important class of materials that have distinct crystal structures with defined pore structures that are shown by distinct X-ray diffraction (XRD) patterns and have specific chemical compositions. The crystal structure defines cavities and pores that are characteristic of the specific type of molecular sieve.

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a unique structure has been established, are assigned a unique three-letter code and are described, for example, in the "*Atlas of Zeolite Framework Types*" by Ch. Baerlocher, L. B. McCusker and D. H. Olson (Elsevier, Sixth Revised Edition, 2007).

BOG framework type molecular sieves have a three-dimensional channel system of 10- and 12-rings. Materials having the BOG framework type include boggsite, ITQ-47 and SSZ-122.

The composition and characterizing X-ray diffraction pattern of molecular sieve SSZ-122 are disclosed in U.S. Patent Appl. Pub. No. 2022/0024775, which also describes the synthesis of the molecular sieve in the presence of an organotemplate comprising 1-adamantyl-3-propylimidazolium cations.

According to the present disclosure, it has now been found that SSZ-122 may be synthesized in the absence of an organotemplate.

SUMMARY

In one aspect, there is provided an organotemplate-free synthetic process for synthesizing an aluminosilicate molecular sieve having a framework structure of SSZ-122, the process comprising: (1) preparing a reaction mixture comprising: (a) a silicon atom source; (b) an aluminum atom source; (c) a source of an alkali metal [M]; (d) a source of hydroxide ions; (e) water; and (f) seed crystals; and (2) subjecting the reaction mixture to crystallization conditions sufficient to form crystals of the aluminosilicate molecular sieve.

In another aspect, there is provided a synthetic organotemplate-free aluminosilicate molecular sieve having a framework structure of SSZ-122, wherein the molecular sieve optionally comprises an alkali metal [M], wherein the molecular sieve is non-calcined.

DETAILED DESCRIPTION

Definitions

Figure 1:
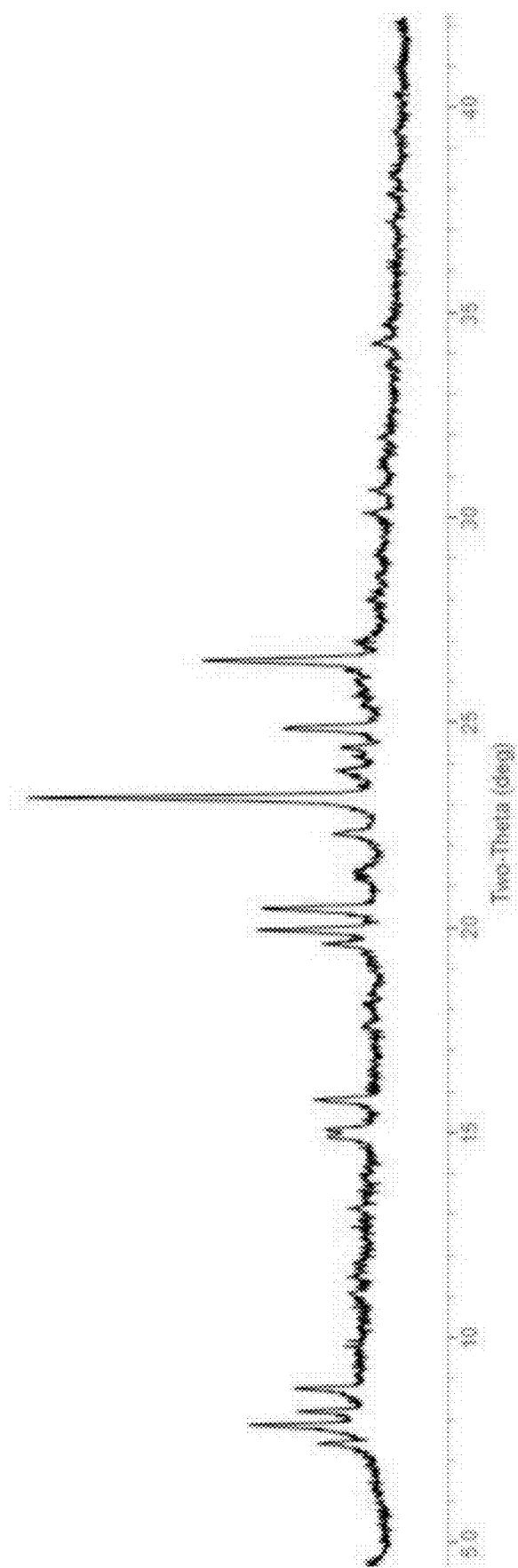
FIG. 1 shows a powder X-ray diffraction (XRD) pattern of an as-synthesized SSZ-122 material in accordance with Example 1.

The term "organotemplate" as employed in the present disclosure designates any conceivable organic material which is suitable for template-mediated synthesis of a molecular sieve material, preferably of a molecular sieve material having a BOG-type framework-structure, and even more preferably which is suitable for the synthesis of SSZ-122. Such organotemplates include 1-adamantyl-3-propylimidazolium cation.

Within the meaning of the present disclosure, an "organotemplate-free" synthetic process relates to a synthetic process wherein the materials used therein are substantially free of organotemplate materials, wherein "substantially" as employed in the present disclosure with respect to the amount of one or more organotemplates contained in the one or more materials used in a synthetic process indicates an amount of 0.001 wt. % or less of one or more organotemplates, such as 0.0005 wt. % or less, or 0.00001 wt. % or less, or 0.000005 wt. % or less, or even 0.000001 wt. % or less thereof. The amounts of one or more organotemplates, if at all present in any one of the materials used in the synthetic process, may also be denoted as "impurities" or "trace amounts" within the meaning of the present disclosure. Furthermore, it is noted that the terms "organotemplate" and "organic structure directing agent" are synonymously used in the present disclosure.

The term "BOG" refers to a BOG topological type as recognized by the International Zeolite Association Structure Commission.

The term "$SiO_2/Al_2O_3$ molar ratio" may be abbreviated as "SAR".

Reaction Mixture

Molecular sieve SSZ-122 can be synthesized by: (1) preparing a reaction mixture comprising (a) a silicon atom source; (b) an aluminum atom source; (c) a source of an alkali metal [M]; (d) a source of hydroxide ions; (e) water; and (f) seed crystals; and (2) subjecting the reaction mixture to crystallization conditions sufficient to form crystals of the aluminosilicate molecular sieve.

The reaction mixture can have a composition, in terms of molar ratios, within the ranges set forth in Table 1:

TABLE 1

| Reactants | Broadest | Typical |
| --- | --- | --- |
| $SiO_2/Al_2O_3$ | ≥10 | 20 to 60 |
| $M/SiO_2$ | 0.05 to 0.50 | 0.10 to 0.40 |
| $OH/SiO_2$ | 0.20 to 0.60 | 0.30 to 0.50 |
| $H_2O/SiO_2$ | 15 to 60 | 20 to 40 | wherein M is an alkali metal.

Examples of silicon atom sources include colloidal suspensions of silica, precipitated silica, fumed silica, alkali metal silicates, tetraalkyl orthosilicates, (e.g., tetraethyl orthosilicate), and mixtures thereof.

Examples of aluminum atom sources include hydrated alumina, aluminum hydroxide, alkali metal aluminates, aluminum alkoxides, and water-soluble aluminum salts (e.g., aluminum nitrate), and mixtures thereof.

Combined silicon atom and aluminum atom sources can also be used, such as aluminosilicate zeolites (e.g., Y-zeolite). The aluminosilicate zeolite may be used as the sole or predominant source of silicon and aluminum. The term "predominant" means greater than 50 mole %, suitably greater than 75 mole % and preferably greater than 90 mole %.

The alkali metal [M] may be selected from lithium, sodium, potassium, rubidium, and cesium, wherein more preferably the alkali metal is sodium and/or potassium, and wherein even more preferably the alkali metal is sodium.

In general, any conceivable source for hydroxide ions can be used, wherein the source preferably comprises a metal hydroxide, particularly a hydroxide of an alkali metal [M], preferably sodium and/or potassium hydroxide, and even more preferably sodium hydroxide.

According to the process of the present disclosure, seed crystals are provided in step (1), wherein the seed crystals comprise a molecular sieve material having a BOG-type framework structure. In general, the seed crystals can comprise any molecular sieve material having a BOG-type framework structure, provided that a molecular sieve material having a BOG-type framework structure is crystallized in step (2). In some aspects, the seed crystals comprise a molecular sieve selected from the group consisting of boggsite, ITQ-47, SSZ-122, and mixtures thereof, wherein even more preferably the seed crystals preferably comprise SSZ-122.

Any suitable amount of seed crystals can be provided in the mixture according to step (1), provided that a molecular sieve material having a BOG-type framework structure is crystallized in step (2). In general, the amount of seed crystals contained in the reaction mixture according to step (1) ranges from 0.01 to 30 wt. % (e.g., 0.1 to 20 wt. %, or 0.5 to 10 wt. %), based on 100 wt. % of $SiO_2$ in the silicon atom source.

According to the present process, at no point does the reaction mixture prepared in step (1) and crystallized in step (2) contain more than an impurity of an organic structure directing agent specifically used in the synthesis of molecular sieve materials having a BOG-type framework structure, in particular specific tetraalkylammonium salts and/or related organotemplates, such as 1-adamantyl-3-propylimidazolium salts. Such an impurity can, for example, be caused by organic structure directing agents still present in seed crystals used in the present process. Organotemplates contained in seed crystal material may not, however, participate in the crystallization process since they are trapped within the seed crystal framework and therefore may not act structure directing agents within the meaning of the present disclosure.

The reaction mixture components can be supplied by more than one source. Also, two or more reaction mixture components can be provided by one source.

The reaction mixture can be prepared by any conceivable means, wherein mixing by agitation is preferred, preferably by means of stirring. The reaction mixture can be prepared in batch, continuous, or semi-continuous mode.

The reaction mixture can be in the form of a solution, a colloidal dispersion (colloidal sol), gel, or paste, with a gel being preferred.

Crystallization and Post-Synthesis Treatment

Crystallization of the molecular sieve may be carried out under static or stirred conditions in a suitable reactor vessel, such as for example, polypropylene jars or Teflon lined or stainless steel autoclaves placed in a convection oven maintained at a temperature of about 100 to about 200° C. for a period of time sufficient for crystallization to occur (e.g., from about 1 day to 21 days, or 1 day to 14 days, or 1 day to 10 days).

Once the desired molecular sieve crystals have formed, the solid product is separated from the reaction mixture by standard separation techniques such as filtration or centrifugation. The recovered crystals are water-washed and then dried, for several seconds to a few minutes (e.g., from 5 seconds to 10 minutes for flash drying) or several hours (e.g., from 4 to 24 hours for oven drying at 75° C. to 150° C.), to obtain as-synthesized molecular sieve crystals. The drying step can be performed at atmospheric pressure or under vacuum.

The molecular sieve crystallized in step (2) can optionally be subject to at least one step of an ion-exchange procedure, wherein the term "ion-exchange" according to the present disclosure generally refers to non-framework ionic elements and/or molecules contained in the molecular sieve material. In some aspects, the non-framework ionic element comprises an alkali metal [M] preferably comprised in the molecular sieve.

In general, any conceivable ion-exchange procedure with all possible ionic elements and/or molecules can be conducted on the molecular sieve, with the exception of organic structure directing agents specifically used in the synthesis of molecular sieve materials having a BOG-type framework structure. In some aspects, as ionic elements at least one cation and/or cationic element is employed which may be selected from the group consisting of $H^+$, $NH_4^+$, Sc, Zr, Cr, Mo, W, Fe, Co, Ni, Cu, Zn, Ru, Rh, Pd, Ag, Os, Ir, Pt, Au, and mixtures thereof.

In the process of the present disclosure, it is preferred that a calcination step is not employed. In general, a calcination step involves the heating of the molecular sieve material crystallized according to step (2) above a temperature of 500° C. In some aspects, the molecular sieve crystallized according to step (2) is not subject in a subsequent step to a temperature exceeding 450° C., or 350° C., or 300° C., or 250° C., or even 200° C.

Characterization of the Molecular Sieve

The product obtainable by the presently described process is a synthetic aluminosilicate molecular sieve having the framework structure of SSZ-122.

Within the meaning of the present disclosure, an "organotemplate-free" molecular sieve relates to a molecular sieve which is substantially free of organotemplate materials, wherein "substantially", as employed in the present disclosure with respect to the amount of one or more organotemplates contained in the molecular sieve, indicates an amount of 0.001 wt. % or less of one or more organotemplates, such as 0.0005 wt. % or less, or 0.00001 wt. % or less, or 0.000005 wt. % or less, or even 0.000001 wt. % or less thereof. The amounts of one or more organotemplates, if at all present in the molecular sieve, may also be denoted as "impurities" or "trace amounts" within the meaning of the present disclosure.

According to the present disclosure, the molecular sieve does not contain more than an impurity of an organic structure directing agent specifically used in the synthesis of molecular sieve materials having a BOG-type framework structure, in particular specific tetraalkylammonium salts and/or related organotemplates such 1-adamantyl-3-propylimidazolium salts. Such an impurity can, for example, be caused by organic structure directing agents still present in seed crystals used in the present process.

The organotemplate-free molecular sieve can have a $SiO_2/Al_2O_3$ molar ratio of at least 10 (e.g., 10 to 100, or 10 to 60, or 15 to 100, or 15 to 60, or 15 to 40, or 20 to 100, or 20 to 60, or 20 to 40, or 25 to 100, or 25 to 60, or 25 to 40).

In aspects wherein the organotemplate-free zeolitic material comprises an alkali metal [M] as non-framework elements, the M:SiO$_2$ molar ratio can be in a range of from greater than 0 to 0.1. In aspects, the molecular sieve comprises sodium and/or potassium as non-framework elements.

In some aspects, at least a portion of the alkali metal [M] optionally present in the molecular sieve is substituted by at least one cation and/or cationic element. The cation and/or cationic element may be selected from the group consisting of H$^+$, NH$_4^+$, Sc, Zr, Cr, Mo, W, Fe, Co, Ni, Cu, Zn, Ru, Rh, Pd, Ag, Os, Ir, Pt, Au, and mixtures thereof.

The powder XRD spectra of the molecular sieve product obtainable by the present process is consistent with other materials having a BOG-type framework structure. Powder XRD patterns representative of BOG framework type molecular sieves can be referenced in the "Collection of Simulated XRD Powder Patterns for Zeolites" by M. M. J. Treacy and J. B. Higgins (Elsevier, Fifth Revised Edition, 2007). The powder XRD patterns presented herein were determined by standard techniques. The radiation was the K-alpha/doublet of copper.

EXAMPLES

The following illustrative examples are intended to be non-limiting.

Example 1

Synthesis of SSZ-122

0.90 g of 50% NaOH solution, 5.00 g of deionized water and 0.096 g of Reheis F-2000 hydrated alumina (53% Al$_2$O$_3$, 47% H$_2$O) were mixed together in a Teflon liner. The resulting gel was stirred until the alumina was completely dissolved. Then, 5.00 g of 30% LUDOX® HS-30 colloidal silica was added to the solution. The gel was stirred until it became homogeneous. Then, 0.15 g of as-synthesized SSZ-122 seed crystals were added to the solution and the gel was further stirred. The liner was then capped and placed within a Parr Steel autoclave reactor. The autoclave was then put in an oven heated at 135° C. for 10 days. The solid products were recovered from the cooled reactor by centrifugation, washed with deionized water and dried at 95° C.

Figure 2:
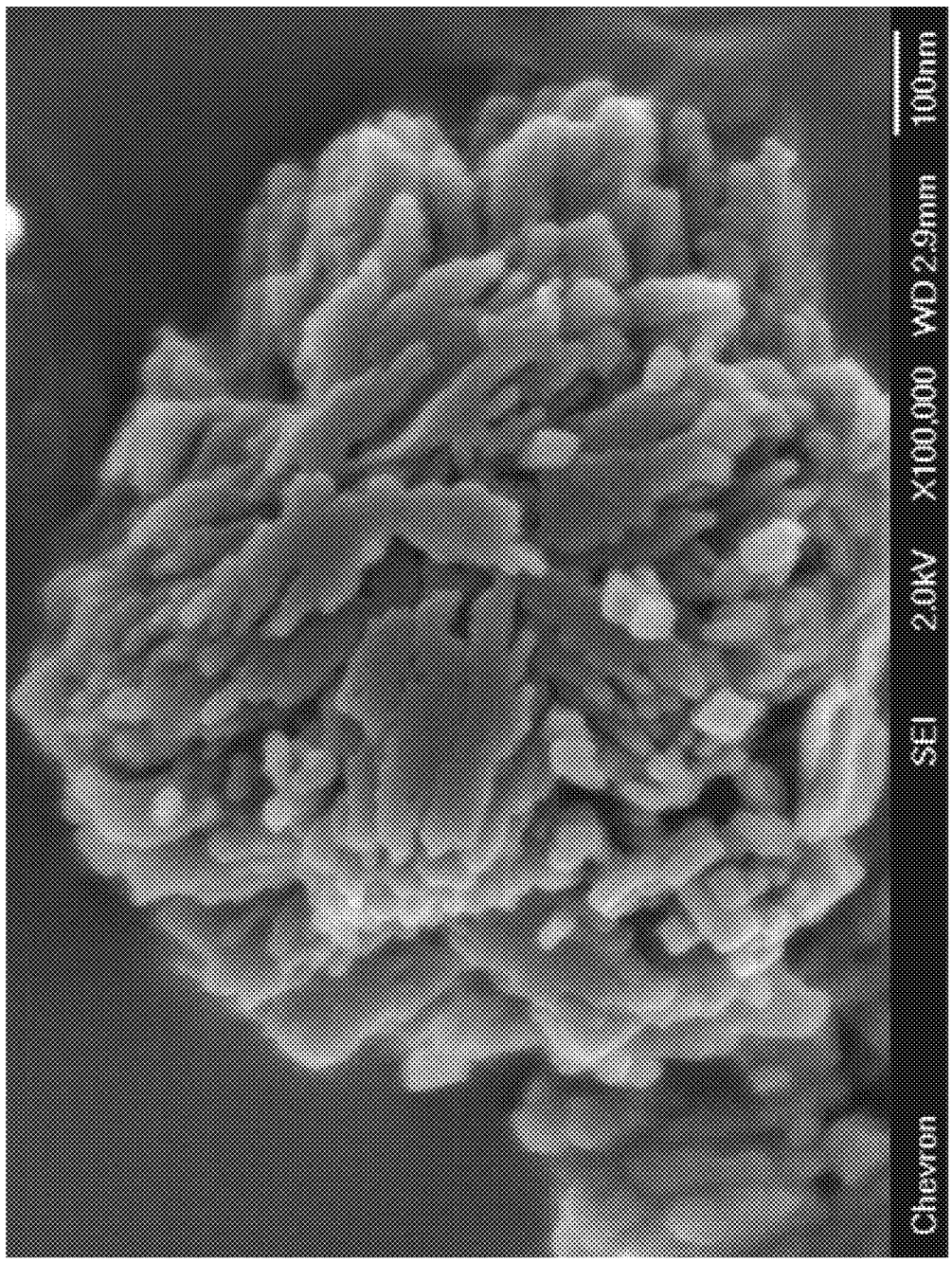
FIG. 2 shows a Scanning Electron Microscopy (SEM) image of an as-synthesized SSZ-122 material in accordance with Example 1.

The resulting product was analyzed by powder XRD and SEM. The powder X-ray diffraction of the product is shown in FIG. 1 and indicates that the material is a pure SSZ-122 molecular sieve. The SEM image is depicted in FIG. 2 and shows a uniform field of crystals.

The product had a SiO$_2$/Al$_2$O$_3$ molar ratio of 26.3, according to ICP elemental analysis.

Example 2

Synthesis of SSZ-122

0.80 g of 50% NaOH solution, 5.07 g of deionized water and 0.06 g Reheis F-2000 hydrated alumina (53% Al$_2$O$_3$, 47% H$_2$O) were mixed together in a Teflon liner. The resulting gel was stirred until the alumina was completely dissolved. Then, 5.00 g of 30% LUDOX® HS-30 colloidal silica was added to the solution. The gel was stirred until it became homogeneous. Then, 0.15 g of as-synthesized SSZ-122 seed crystals were add to the solution and the gel was further stirred. The liner was then capped and placed within a Parr Steel autoclave reactor. The autoclave was then put in an oven heated at 135° C. for 10 days. The solid products were recovered from the cooled reactor by centrifugation, washed with deionized water and dried at 95° C.

The resulting zeolite product was identified by powder XRD and SEM as a pure SSZ-122 molecular sieve.

The product had a SiO$_2$/Al$_2$O$_3$ molar ratio of 34.8, according to ICP elemental analysis.

Example 3

Synthesis of SSZ-122

0.39 g of 50% NaOH solution, 8.51 g of deionized water and 1.00 g of CBV720 Y-zeolite (SAR=30) powder were mixed together in a Teflon liner. Then, 0.10 g of as-synthesized SSZ-122 seed crystals were added to the solution. The resulting gel was stirred until it became homogeneous. The liner was then capped and placed within a Parr Steel autoclave reactor. The autoclave was then put in an oven heated at 135° C. for 7 days. The solid products were recovered from the cooled reactor by centrifugation, washed with deionized water and dried at 95° C.

The resulting zeolite product was identified by powder XRD and SEM as a pure SSZ-122 molecular sieve.

The product had a SiO$_2$/Al$_2$O$_3$ molar ratio of 23.7, according to ICP elemental analysis.

Example 4

Calcination

The as-synthesized product of Example 1 was calcined inside a muffle furnace under a flow of air heated to 540° C. at a rate of 1° C./minute and held at 540° C. for 5 hours, cooled and then analyzed by powder XRD. The powder XRD pattern indicated that the material remains stable after calcination.

Example 5

Ammonium Ion Exchange

The calcined material from Example 4 was treated with 10 mL (per g of zeolite) of a 1 N ammonium nitrate solution at 90° C. for 2 hours. The solution was cooled, decanted off and the same process repeated.

The product (NH$_4$-SSZ-122) after drying was subjected to a micropore$_2$ volume analysis using N as adsorbate and via the BET method. The molecular sieve exhibited a micropore volume of 0.19 cm$^3$/g.

The invention claimed is:

1. An organotemplate-free synthetic process for synthesizing an aluminosilicate molecular sieve having a framework structure of SSZ-122, the process comprising:
   (1) preparing a reaction mixture comprising:
      (a) a silicon atom source;
      (b) an aluminum atom source;
      (c) a source of an alkali or alkaline earth metal [M];
      (d) a source of hydroxide ions;
      (e) water; and
      (f) seed crystals; and
   (2) subjecting the reaction mixture to crystallization conditions sufficient to form crystals of the aluminosilicate molecular sieve;
   wherein the source of both the silicon atom and the aluminum atom is a Y-zeolite.

2. The process of claim 1, wherein the reaction mixture has a composition, in terms of molar ratios, as follows:

| | |
|---|---|
| SiO$_2$/Al$_2$O$_3$ | ≥10 |
| M/SiO$_2$ | 0.05 to 0.50 |
| OH/SiO$_2$ | 0.20 to 0.60 |
| H$_2$O/SiO$_2$ | 15 to 60. |

3. The process of claim 1, wherein the reaction mixture has a composition, in terms of molar ratios, as follows:

| | |
|---|---|
| SiO$_2$/Al$_2$O$_3$ | 20 to 60 |
| M/SiO$_2$ | 0.10 to 0.40 |
| OH/SiO$_2$ | 0.30 to 0.50 |
| H$_2$O/SiO$_2$ | 20 to 40. |

4. The process of claim 1, wherein the alkali metal [M] is selected from the group consisting of lithium, sodium, potassium, rubidium, cesium, or a mixture thereof.

5. The process of claim 1, wherein the alkali metal [M] comprises sodium, potassium, or a mixture thereof.

6. The process of claim 1, wherein the seed crystals comprise a molecular sieve material having a BOG-type framework structure.

7. The process of claim 6, wherein the seed crystals comprise a molecular sieve selected from the group consisting of boggsite, ITQ-47, SSZ-122, and mixtures thereof.

8. The process of claim 1, wherein an amount of seed crystals in the reaction mixture according to step (1) ranges from 0.01 to 30 wt. %, based on 100 wt. % of SiO$_2$ in the silicon atom source.

9. The process of claim 1, wherein the crystallization conditions according to step (2) comprise a temperature of from 100° C. to 200° C., and a crystallization time of from about 1 day to 21 days.

10. The process of claim 1, wherein the organotemplate-free synthesis does not comprise a calcination step.

* * * * *